UNITED STATES PATENT OFFICE.

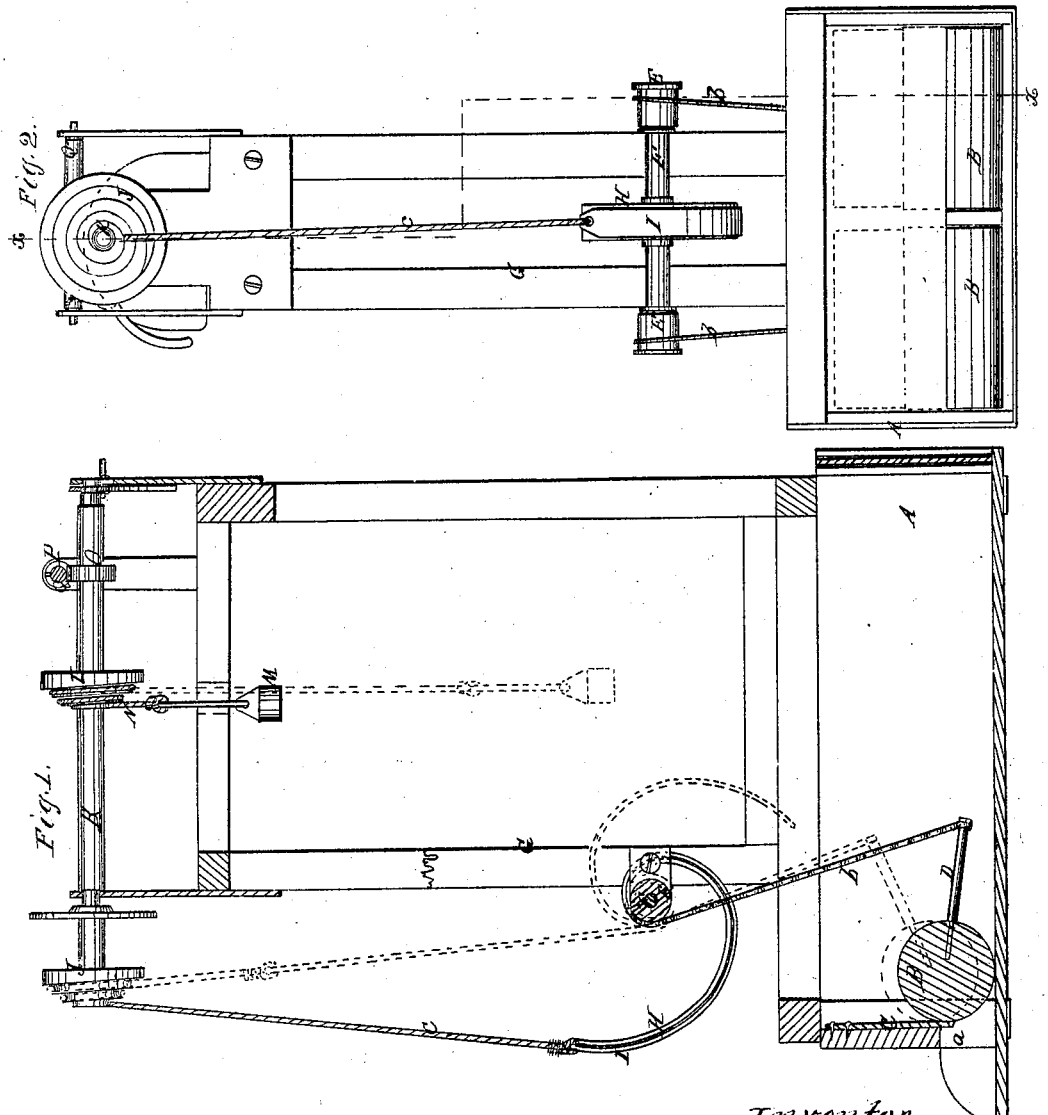
J. W. Pitt
Water-Wheel Gate.
N° 41,939. Patented Mar. 15, 1864.
Witnesses
Inventor
J. W. Pitt

J. W. PITT, OF NORTH ADAMS, MASSACHUSETTS.

IMPROVED METHOD OF CONNECTING GOVERNORS WITH THE GATES OF WATER-WHEELS.

Specification forming part of Letters Patent No. 41,939, dated March 15, 1864.

*To all whom it may concern:*

Be it known that I, J. W. PITT, of North Adams, in the county of Berkshire and State of Massachusetts, have invented a new and useful Improvement in the Application of Governors to the Gates of Water-Wheels; and I do hereby declare that the following is a full, clear, and exact description of the same, reference being had to the accompanying drawings, making a part of this specification, in which—

Figure 1 is a side sectional view of a penstock and gate, with my invention applied to the latter, $x$ $x$, Fig. 2, indicating the line of section; Fig. 2, a front view of the same.

Similar letters of reference indicate corresponding parts in the two figures.

The object of this invention is to apply a governor to the gate of a water-wheel in such a manner that the gate will be raised with an accelerated or gradually-increasing speed and lowered with a corresponding diminution of speed, whereby the movement of the gate will at all times be proportionate to the volume of water and power required. The opening and closing movement of a gate as operated by the ordinary application of the governor is a constant one—that is to say, the speed of the opening and closing movement of the gate always has the same relation with the speed of the governor-shaft, and hence considerable time elapses before the right speed of machinery is attained after work has been added to or taken from the wheel, or, in other words, connected with or disconnected from the driving-shaft. My invention obviates this difficulty, and much wear and tear of machinery avoided, as well as the breaking of belts, and other casualties consequent on an irregular driving movement of machinery.

To enable those skilled in the art to fully understand and construct my invention, I will proceed to describe it.

A represents a penstock, and B B two gates fitted therein. These gates may be of cylindrical form and attached to aprons C, of leather or other flexible material, which are secured to the inner side of the penstock above its discharge-aperture $a$, (see Fig. 1,) and cause the gates to rise as they are turned, as indicated in red.

Each gate B has a rod, D, projecting from its rear side, and these rods are each connected by a chain, $b$, with pulleys E E, on a horizontal shaft, F, the bearings of which are attached to a framing, G, on the penstock. This shaft F has a spiral or scroll-shaped arm, H, attached to it, and also a strap, I, the latter extending around the outer side of the former and connected by a cord or chain, $c$, to a grooved cone-pulley, J, on a shaft, K, which is connected with and driven by the governor, as usual. The shaft K also has upon it a grooved cone-pulley, L, to which a weight, M, is suspended by a cord or chain, N. This weight and cone-pulley are designed to counterpoise the gates.

O is a worm-wheel on the shaft K, and P is a screw on a shaft, Q, which screw gears into the worm-wheel O. The shaft Q is turned in either direction under the action of the governor in the usual way.

When the gates B B are closed, the arm H is in the position shown in Fig. 1, and the cord or chain $c$ at the outer and smaller end of the cone-pulley J, while the cord or chain N of the weight M is fully wound upon the cone-pulley L, the weight depending from the smaller end of the latter.

From the above description it will be seen that when the gates are opened they will move with an accelerated or gradually-increasing speed, as the strap I gradually approaches the shaft F as the arm H is drawn upward, and the cord or chain $c$ gradually passes on an enlarged circumference of the cone-pulley J. The gates in closing move, of course, with a corresponding diminishing speed. By this means the speed of the movement of the gates in opening and closing is made to correspond with the quantity or volume of water required in order to render the speed of the wheel uniform. The force of water issuing from a flume or penstock, as is well known, gradually diminishes from the bottom of the orifice to its upper end, owing to the diminution of head, and hence, in order to economize in time and insure a uniform movement of the machinery driven the gates in rising require to move with an accelerated speed, in order to admit of an enlarged volume escaping to compensate for the diminished force, and for the same reason the gates in closing require to move with a gradually-decreasing speed to compensate for the increasing force of the water.

Having thus described my invention, what I claim as new, and desire to secure by Letters Patent, is—

The applying of a governor to the gate of a water-wheel, in the manner substantially as described, so that the gate in opening will move with an accelerated or gradually-increasing speed, and in closing move with a corresponding diminution of speed to compensate for the varying force of the water at different heights of the discharge-orifice, as set forth.

J. W. PITT.

Witnesses:
C. A. RICHARDSON,
F. P. HAYNES.